United States Patent [19]

Peterson

[11] Patent Number: 4,846,206

[45] Date of Patent: Jul. 11, 1989

[54] AUTOMATIC WATERING SYSTEM USING SIPHON ACTION

[76] Inventor: Myron L. Peterson, 4773 Christy Dr., Kingman, Ariz. 86401

[21] Appl. No.: 132,769

[22] Filed: Dec. 14, 1987

[51] Int. Cl.⁴ ............................................. F16L 43/00
[52] U.S. Cl. ...................................... 137/1; 137/124; 137/132; 137/883; 47/59; 239/68
[58] Field of Search ................... 137/132, 124, 153, 1; 222/204, 416; 239/347, 99, 68, 37, 39, 44

[56] References Cited

U.S. PATENT DOCUMENTS

| | | | |
|---|---|---|---|
| 287,179 | 10/1883 | Sexton | 137/124 |
| 3,272,225 | 9/1966 | Frampton | 137/132 X |
| 3,399,638 | 9/1968 | Waldrun et al. | 239/347 X |
| 3,856,205 | 12/1974 | Robling | 239/276 X |
| 4,223,837 | 9/1980 | Gubbiotti | 239/276 X |
| 4,291,836 | 9/1986 | Chen-Hsiung | 239/37 |

FOREIGN PATENT DOCUMENTS 542029  2/1977  U.S.S.R. ............... 222/416

Primary Examiner—Andres Kashnikow
Assistant Examiner—Kevin P. Weldon
Attorney, Agent, or Firm—Edward E. Roberts

[57] ABSTRACT

An apparatus, including a primary container or tank for receiving fluid, and a secondary or dispersing tank at a lower level for receiving fluid in a controlled manner from the upper tank. Fluid transfer is perfomed by siphoning tubes, at least one primary siphoning tube being contained within the primary tank. The primary tank includes an opening with a fitting for attachment to a conventional source of water such as to a hose connected to a municipal water supply. The primary siphon tube effects flow of fluid to the secondary tank, which contains a plurality of smaller diameter siphon tubes, with each tube in turn providing fluid to a receiving area, such as one or a group of plant beds. A valve is provided for controlling the outlet of the primary siphon tube. Vertical adjustments can be made to the secondary tank siphon tubes provided for controlling the respective outlets of the secondary tank siphon tubes. The siphon tubes are configured to provide an inverted U-shaped portion within the respective tank, with the loop portion thereof in proximate relation to the upper level of fluid to be received within the tank.

20 Claims, 1 Drawing Sheet

AUTOMATIC WATERING SYSTEM USING SIPHON ACTION

BACKGROUND OF THE INVENTION

The background of the invention will be discussed in two parts.

FIELD OF THE INVENTION

This invention relates to plant watering systems, and more particularly to self-powered apparatus for automatic volume and time controlled dispersal of liquids by siphoning action to a selected number of receiving areas.

DESCRIPTION OF THE PRIOR ART

The feeding and watering of plants, particularly, garden and household plants, can be a tedious chore, particularly when there are several different spaced apart areas which require attention. Various types of watering systems have been developed for such chores.

One such system, using siphoning action, in part, is shown and described in U.S. Pat. No. 4,291,836, entitled "Intermittent Water Supply System", which issued to Chen-Hsiung on Sept. 29, 1981, another system using siphoning action is shown and described in U.S. Pat. No. 4,223,837, entitled "Dosed Delivery Device for Liquids, Particularly for Delivering Water to Vegetal Cultivations", which issued to Gubbiotti, on Sept. 23, 1980.

Other patents uncovered in a search which show some form of siphon device, are U.S. Pat. Nos. 359,502 for an oil lamp; 754,132, for a bellows actuated dispenser; 2,589,068, for a bar accessory; 3,385,483, for a chemical feeder; 3,399,638, for a mobile agricultural spray device; and 3,501,057, for a liquid dispenser.

Such prior art devices for plant watering and feeding have tended to be unduly complicated, and have not been totally satisfactory from the standpoint of providing a long-term unattended liquid and nutrient supply.

In accordance with the invention, it is an object to provide a new and improved apparatus utilizing siphoning action for automatic volume and time controlled dispersal of liquids to a selected number of receiving areas.

SUMMARY OF THE INVENTION

In accordance with a preferred embodiment of the present invention, there is provided an apparatus, including a primary container or tank for receiving fluid, and a secondary or dispersing tank at a lower level for receiving fluid in a controlled manner from the upper tank. Fluid transfer is effected by means of siphoning tubes, at least one primary siphoning tube being contained within the primary tank. The primary tank includes an opening with a fitting for attachment to a conventional source of water such as to a hose connected to a municipal water supply. The primary siphon tube effects flow of fluid to the secondary tank, which contains a plurality of smaller diameter siphon tubes, with each tube in turn providing fluid to a receiving area, such as one or a group of plant beds. An adjustable valve controls the outlet of the primary siphon tube. The siphon tubes are configured to provide an inverted U-shaped portion within the respective tank, with the loop portion thereof in proximate relation to the upper level of fluid to be received within the tank.

The foregoing and other objects of the invention will become apparent from a reading of the specification, when taken in conjunction with the drawings, in which like reference numerals refer to like elements in the several views.

BRIEF DESCRIPTION OF THE DRAWINGS

The sole FIGURE is a perspective view of the plant feeding and watering apparatus according to the invention.

DESCRIPTION OF THE PREFERRED EMBODIMENTS

Figure 1:
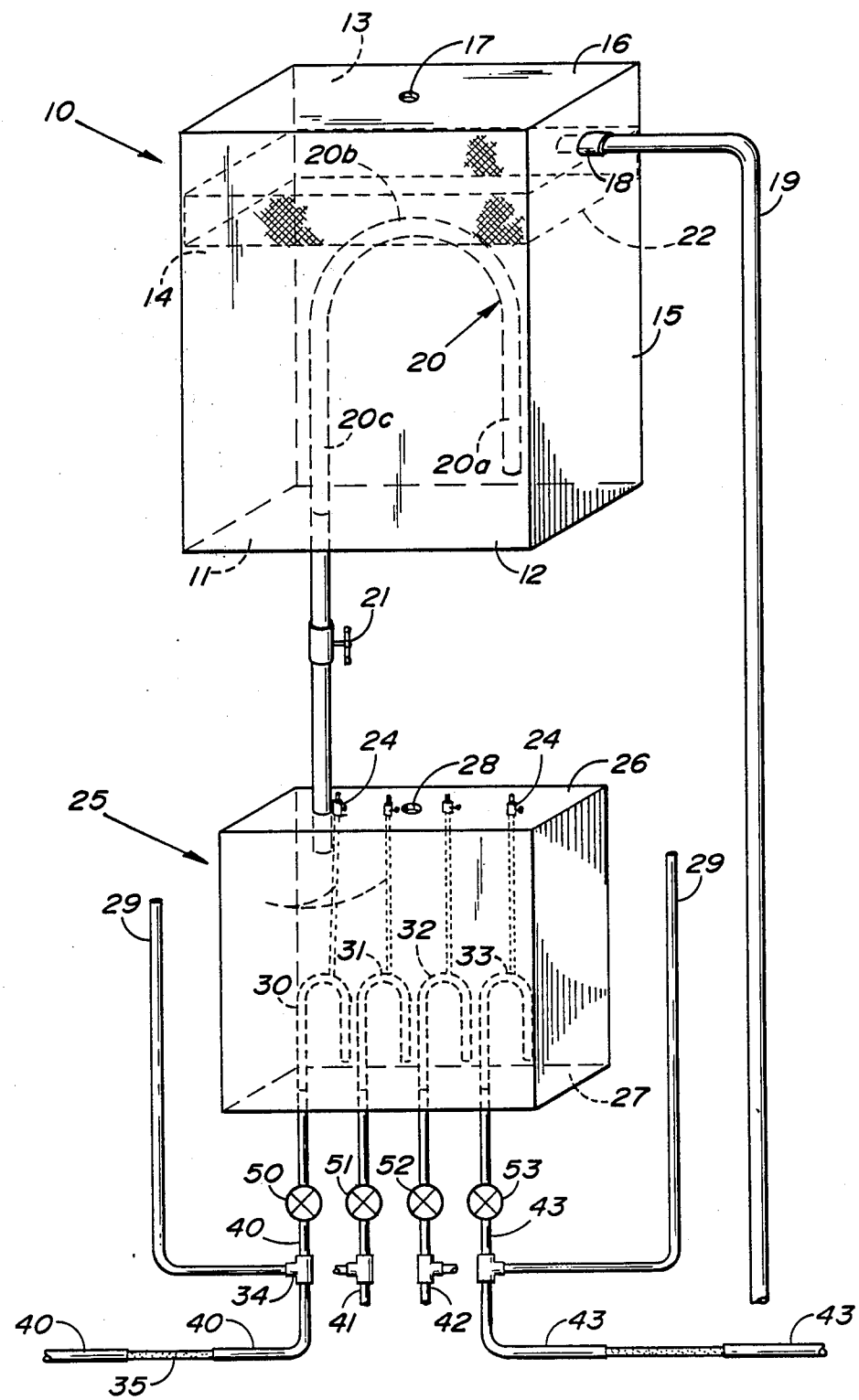

Referring now to the drawings, there is shown a watering system including reservoir means, such as a main tank 10, which may be formed in any convenient configuration, of any suitable material for containing water and liquid nutrients for plants and the like. In the preferred embodiment the tank 10 is a watertight enclosure which is generally cubically configured, and includes a bottom 11, front and rear walls 12 and 13, opposing sidewalls 14 and 15, and a top 16. The top 16 is provided with a vent aperture 17. One sidewall 15 is provided with a suitable water receiving fitting 18, adjacent the upper edge of sidewall 15, the fitting 18 being suitably coupled to a water supply pipe or hose 19, which, in turn, is connected to a suitable source of water, such as a municipal water supply.

As shown in dotted lines in FIG. 1, a screening basket 22 is located in the top of tank 10 positioned in relation to receiving fitting 18 to screen out any sediment that might be introduced into the tank 10 by way of the water supply.

A main siphon tube 20 is positioned within the tank 10. The siphon tube 20 includes a short leg 20a, a loop portion 20b and a long leg 20c which extends through an opening in the bottom 11 of the main tank 10. A valve member 21 is provided in flow communication with the siphon tube 20 external to the main tank 10 for controlling the flow of fluid to the dispersing tank 25. The siphon tube 20 is of an inverted generally J-shaped configuration with the legs 20a and 20c being generally parallel and the interconnecting loop portion 20b being inverted with the uppermost edge adjacent the top of the interior of the tank 10, and at a level equal to or slightly below the inlet of the fitting 18. The open end of the short leg 20a is spaced a predetermined distance from the bottom 11 of the tank 10, but preferably in proximate relation to the bottom 11.

Below the main tank 10, there is an auxiliary reservoir means in the form of a dispersing tank 25, which is likewise watertight and a cubically configured enclosure. The main tank siphon tube 20 extends through an opening in the top 26 of the dispersing tank 25 with water from the main tank 10 passing through the siphon tube 20 into the dispersing tank 25 as will be described. The top 26 is provided with an air vent aperture 28. The bottom of the dispersing tank 25 is provided with a number of openings through which pass the long legs of a plurality of smaller, generally identically inverted J-shaped configuration dispersing siphon tubes 30–33.

Each of the siphon tubes 30–33 has a long leg thereof extending through appropriate openings in the bottom 27 of the tank 25. The loop portions of the tubes 30–33 are located in proximate relation to the upper interior of the dispersing tank 25, and the open ends of the short legs are located in proximate relation to the bottom 27 of the tank 25. Suitable fluid transfer tubes or hoses 40–43 are coupled to the outside of tank 25 to the outer ends of the long legs of siphon tubes 30-33. Each tube or hose 40-43 is then directed to an appropriate liquid receiving area, such as a small garden plot.

In operation, water is supplied to the main tank 10 through the hose 19 and fitting 18. When water reaches the top or near the top of the loop portion 20b of siphon tube 20, water starts siphoning at a rate of six times or more faster than the input of water. This siphoning continues until the solution is siphoned to the bottom open end of the short leg 20a of siphon tube 20, whereupon the siphoning action stops. As long as water is entering the tank 10, the main tank 10 starts refilling, and the system continues to disperse water automatically.

Water from the main tank 10 flows into the dispersing tank 25 therebelow under force of gravity, with the rate of flow controlled by means of adjustment of valve 21 in fluid flow relation with main tank siphon tube 20. Water (or solution with fertilizer added) is siphoned through tube 20, through valve 21 into the dispersing tanks 25. This tank is similar to the main tank 10 except it is normally smaller and has several siphon tubes 30-33 in the dispersing tank 25. Siphoning action is used rather than just gravity flow due to the fact that, with gravity flow, there is a tendency of formation of air locks in some of the dispensing tubes.

In accordance with the invention, the sum total of the inner diameters of the dispensing siphon tubes 30-33 is preferably smaller than the inner diameter of the main tank siphon tube 20. In this manner, water siphoned from the main tank 10 to the lower or dispersing tank 25 may provide a continuous flow of water to a large number of receiving areas for a predetermined period of time.

Adjustments to the system flow rate of water may be effected for different watering needs by utilizing siphon tubes of different internal diameters, or siphon tubes having different lengths of long legs, or even short legs.

Furthermore, the siphon tubes 30-33 may be configured for vertical adjustment, that is, means for axially adjusting each tube 30-33, such as wire and clamp means 24, may be provided on the axis of the long leg to place the loop portion thereof higher or lower, and thereby enable a lower positioned tube to commence siphoning sooner than another, thereby to vary the volume of water between receiving stations by such adjustment. Such adjustment may likewise be accomplished by providing valves 50-53 in line with tubes or hoses 40-43, if desired.

Also, if desired or if necessary as for instance during hot weather, means for providing additional air to tubes 40-43 may be added. For example, an air supply line 29 could be attached to each of the tubes 40-43 in proximity to valves 50-53 by means of a tee (T) fitting, with the other end (open end) of the line positioned above (higher than) the siphon tubes 30-33. The air provides means for facilitating the flow of liquid from auxiliary tank 25.

In addition, although not shown in the drawing but in keeping with the invention, auxiliary dispensing tanks of different sizes may be coupled in tandem to one main tank 10 or in series with the dispersing tank 25, depending on needs.

Further, means for controlling the emission of fluid from the system can be provided by the inclusion of emitter tubes 35 connected to tubes 40-43, the emitter tubes positioned at desired locations and having a selected number of selected sized holes therein for dispersal of the fluid. In a preferred embodiment the total diameters of the holes in the emitters of a given tube (40 for instance) does not exceed the inside diameter of that particular tube (40 for instance).

In accordance with the present invention, the apparatus provides a self-contained apparatus for automatic volume and time controlled dispersal of liquids to a selected number of receiving areas without the need for electrical or other power.

While there has been shown and described a preferred embodiment, it is to be understood that various other adaptations and modifications may be made without departing from the spirit and scope of the invention.

What is claimed is:

1. Apparatus for dispensing liquid to a plurality of liquid receiving areas, the apparatus comprising:
   first reservoir means for receiving liquid;
   first siphon means within said first reservoir means for siphoning liquid from said first reservoir means;
   second reservoir means;
   means interconnecting said first siphon means to said second reservoir means for enabling flow of liquid from said first reservoir means to said second reservoir means; and
   second siphon means, including a plurality of siphon tubes within said second reservoir means for enabling flow of liquid therefrom to a number of liquid receiving areas.

2. The apparatus according to claim 1 wherein said first reservoir means is a tank having means for connection to a source of pressurized water.

3. The apparatus according to claim 1 wherein said first siphon means is at least one inverted generally J-shaped siphon tube.

4. The apparatus according to claim 3 wherein said first reservoir means is a main tank connectable to a source of water, and said second reservoir means is at least one auxiliary tank below said main tank.

5. The apparatus according to claim 4 wherein said first siphon means is an inverted generally J-shaped siphon tube, and said second siphon tubes are generally similarly configured but of smaller internal tubular diameter.

6. The apparatus according to claim 5 wherein each of said main and auxiliary tanks include air vent means adjacent the tops thereof.

7. The apparatus according to claim 6 wherein each of said second siphon tubes include flow control means.

8. The apparatus according to claim 1 wherein said interconnecting means includes flow control means.

9. Apparatus for dispensing liquid to a plurality of liquid receiving areas, the apparatus comprising:
   a main tank configured means for receiving liquid;
   means for connecting said main tank means to a source of pressurized water;
   an inverted generally J-shaped main siphon tube within said main tank means, said siphon tube having a long leg, a short leg and an interconnecting loop portion, said loop portion being adjacent the top of said main tank means, with the long leg extending through the bottom of said main tank means, the siphoning of liquid from said main tank means commencing when the liquid level therein is at or near the top of said loop portion;
   an auxiliary tank;
   means interconnecting the long leg of said main siphon tube to said auxiliary tank for enabling flow of liquid from said main tank to said auxiliary tank;

other siphon means, including a plurality of like-shaped inverted generally J-shaped auxiliary siphon tubes within said auxiliary tank with the long legs thereof terminating on the exterior of said auxiliary tank; and means coupled to each of the long legs of said auxiliary siphon tubes for enabling flow of liquid from said auxiliary tank to a number of liquid receiving areas.

10. The apparatus according to claim 9 wherein said interconnecting means to said main siphon tube includes fluid control means for controlling the flow of liquid to said auxiliary tank.

11. The apparatus according to claim 9 wherein said siphon tubes within said auxiliary tank includes adjustment means for adjusting selected ones of said siphon tubes in a vertical direction to thereby vary the volume of fluid through said siphon tubes.

12. The apparatus according to claim 11 wherein selected ones of said long legs of said auxiliary siphon tubes includes venting means for providing air to said long legs to thereby facilitate the flow of liquid from said auxiliary tank.

13. The apparatus according to claim 12 wherein selected ones of said means coupled to each one of said long legs of said auxiliary siphon tubes includes emission control means for controlling the emission of liquid at the liquid receiving areas.

14. The apparatus according to claim 13 wherein said emission control means includes emitter tubes having a selected number of selected sizes holes therein for dispersal of said liquid.

15. The apparatus according to claim 14 wherein the sum total of the diameters of said holes does not exceed the inside diameter of the long leg of the main siphon tube.

16. The apparatus according to claim 10 wherein said main tank means includes screening means for filtering sediment from fluid introduced into said main tank means.

17. A method for dispensing liquid to a plurality of liquid receiving areas, said method comprising:
providing first reservoir means with a primary siphon tube therein, said first reservoir means being configured for receiving liquid;
providing second reservoir means having a plurality of auxiliary siphon tubes therein;
siphoning liquid from said first reservoir means to said second reservoir means through said main siphon tube;
siphoning liquid from said second reservoir means in response to the flow of liquid therein of sufficient volume to generate siphoning action; and
directing the liquid from each of said auxiliary siphon tubes to liquid receiving areas.

18. The method according to claim 17 further including flowing liquid into said first reservoir means, and wherein said step of siphoning liquid from said first reservoir means commences in response to the flow of liquid therein of sufficient volume to generate siphoning action.

19. The method according to claim 17 further including the step of controlling the flow of liquid during the siphoning of liquid from said first reservoir means.

20. The method according to claim 19 including the step of controlling the flow of liquid during the siphoning of liquid from said second reservoir means.

* * * * *